(12) United States Patent
Cameron et al.

(10) Patent No.: US 12,281,009 B2
(45) Date of Patent: Apr. 22, 2025

(54) METHOD AND APPARATUS FOR GENERATING CHLORINE DIOXIDE

(71) Applicant: SCOTMAS GROUP LIMITED, Kelso (GB)

(72) Inventors: Alistair Peter Cameron, Kelso (GB); Nicola Louise Palmer, Kelso (GB); Thomas James Livesey, Kelso (GB)

(73) Assignee: Scotmas Group Limited, Kelso (GB)

( * ) Notice: Subject to any disclaimer, the term of this patent is extended or adjusted under 35 U.S.C. 154(b) by 1096 days.

(21) Appl. No.: 17/255,282

(22) PCT Filed: Jun. 25, 2019

(86) PCT No.: PCT/GB2019/051788
§ 371 (c)(1),
(2) Date: Dec. 22, 2020

(87) PCT Pub. No.: WO2020/002901
PCT Pub. Date: Jan. 2, 2020

(65) Prior Publication Data
US 2021/0171347 A1    Jun. 10, 2021

(30) Foreign Application Priority Data

Jun. 25, 2018  (GB) .................................. 1810369

(51) Int. Cl.
*C01B 11/02*    (2006.01)
*B01D 69/14*    (2006.01)
(Continued)

(52) U.S. Cl.
CPC .......... *C01B 11/028* (2013.01); *B01D 69/145* (2013.01); *B01J 23/34* (2013.01);
(Continued)

(58) Field of Classification Search
CPC ....... C01B 11/028; B01J 35/643; B01J 35/59; B01J 23/34; B01J 23/42; B01J 31/08; B01D 69/145

See application file for complete search history.

(56) References Cited

U.S. PATENT DOCUMENTS

| | | | |
|---|---|---|---|
| 4,683,039 | A | 7/1987 | Twardowski et al. |
| 2003/0082095 | A1 | 5/2003 | DiMascio |

(Continued)

FOREIGN PATENT DOCUMENTS

| | | |
|---|---|---|
| EP | 0 230 737 A1 | 8/1987 |
| JP | 2013-144085 A | 7/2013 |

(Continued)

OTHER PUBLICATIONS

Search Report in GB Application No. 1810369.7, mailed on Nov. 26, 2018.

(Continued)

*Primary Examiner* — James A Fiorito
(74) *Attorney, Agent, or Firm* — Foley & Lardner LLP (57) ABSTRACT

There is disclosed a method of forming chlorine dioxide comprising passing chlorous acid through a membrane including a catalyst suitable to catalyse the formation of chlorine dioxide from chlorous acid. There is also disclosed a membrane suitable for forming an aqueous solution of chlorine dioxide comprising a catalyst suitable to catalyse the formation of chlorine dioxide from chlorous acid or alkali metal chlorite.

12 Claims, 1 Drawing Sheet

(51) Int. Cl.
*B01J 23/34* (2006.01)
*B01J 23/42* (2006.01)
*B01J 31/08* (2006.01)
*B01J 35/59* (2024.01)
*B01J 35/64* (2024.01)

(52) U.S. Cl.
CPC .............. *B01J 23/42* (2013.01); *B01J 31/08* (2013.01); *B01J 35/59* (2024.01); *B01J 35/643* (2024.01); *B01D 2311/2696* (2013.01); *B01D 2325/10* (2013.01)

(56) References Cited

U.S. PATENT DOCUMENTS

| | | | |
|---|---|---|---|
| 2005/0079124 A1* | 4/2005 | Sanderson | C01B 11/024 422/186 |
| 2005/0095192 A1 | 5/2005 | DiMascio | |
| 2005/0163700 A1* | 7/2005 | DiMascio | C01B 11/00 423/477 |
| 2006/0280673 A1 | 12/2006 | DiMascio | |
| 2006/0292059 A1* | 12/2006 | DiMascio | B01J 8/0221 502/79 |
| 2007/0253891 A1 | 11/2007 | Sampson et al. | |

FOREIGN PATENT DOCUMENTS

| | | |
|---|---|---|
| JP | 2016-183088 A | 10/2016 |
| KR | 20110047680 A | 5/2011 |
| KR | 10-1562251 B1 | 10/2015 |
| WO | WO-2008/035130 A2 | 3/2008 |

OTHER PUBLICATIONS

International Search Report and Written Opinion in International Application No. PCT/GB2019/051788, mailed on Oct. 15, 2019.

* cited by examiner

METHOD AND APPARATUS FOR GENERATING CHLORINE DIOXIDE

CROSS REFERENCE TO RELATED APPLICATIONS

The present application is a U.S. National Phase Application under 35 U.S.C. § 371 of International Application No. PCT/GB2019/051788 filed on Jun. 25, 2019, which claims priority to GB Patent Application No. 1810369.7 filed on Jun. 25, 2018, the contents of which are incorporated herein in their entireties.

The present invention relates to a method and apparatus for generating chlorine dioxide in a very pure form, in particular for the disinfection and/or purification of water. There is also provided a membrane for use in a water disinfection and/or purification apparatus.

BACKGROUND TO THE INVENTION

U.S. Pat. No. 4,683,039 discloses a membrane pervaporation process method for the production of chlorine dioxide and its separation using a hydrophobic macroporous membrane.

U.S. Pat. No. 7,087,208 discloses a method of generating chlorous acid from a chlorite salt or chlorate salt precursor by ion exchange. There is also disclosed a method of converting chlorous acid, produced via ion exchange, to chlorine dioxide using at least one catalytic material.

U.S. Pat. No. 5,008,096 discusses a method for enhancing generation of chlorine dioxide from sodium chlorite precursor using a catalyst supported to an inert matrix.

Catalytic chlorine dioxide generators are known. These generally include chlorous acid being oxidised to chlorine dioxide via reaction with a catalyst. A known issue with these systems is that the chlorine dioxide is also in contact with the catalyst and can be further oxidised to chlorate and/or perchlorate. The generated chlorine dioxide solution, and therefore generated chlorate and/or perchlorate ions, are then dosed directly into the water to be treated.

Methods of producing chlorine dioxide known in the art generally produce chlorine dioxide including significant levels of impurities such as chlorite, chlorate, perchlorate and chloride. Prior art methods also involve numerous separate steps and therefore must be operated by skilled users. This is particularly apparent in catalyst based systems which may result in over-oxidation of the produced chlorine dioxide to chlorate and perchlorate due to extended contact with the oxidation catalyst.

Prior art methods of generating chlorine dioxide froth the direct reaction of sodium chlorite with hydrochloric acid generally require the use of a large excess of hydrochloric acid (typically 3-6× stoichiometric excess) in order to achieve efficient generation of chlorine dioxide. The excess acid released can cause issues of pH depression, particularly in recirculating loop cooling systems and desalinated waters.

The methods and apparatus of the present invention allow the production of high purity aqueous chlorine dioxide whilst reducing the quantity of acid required to efficiently convert precursors to chlorine dioxide. The methods and apparatus of the present invention are less complex than prior art methods and apparatus and are applicable to a wide range of chlorine dioxide production capacities, including low volume production of $ClO_2$. In addition, the potential for the chlorine dioxide generated to be further oxidised to chlorate is reduced.

STATEMENT OF INVENTION

According to a first aspect of the present invention, there is provided a method of forming chlorine dioxide comprising:
feeding a chlorous acid formulation and/or an alkali metal chlorite formulation to a first face of a hydrophobic microporous membrane wherein the membrane comprises a catalyst suitable to catalyse the formation of chlorine dioxide from chlorous acid and/or a catalyst suitable to catalyse the formation of chlorine dioxide from the alkali metal chlorite;
wherein the chlorous acid and/or the alkali metal chlorite contact the catalyst and form chlorine dioxide;
wherein gaseous chlorine dioxide passes through the hydrophobic microporous membrane to a second face thereof wherein the second face is in fluid communication with an outlet for providing the chlorine dioxide formed.

According to a further aspect of the present invention, there is provided a method of forming chlorine dioxide comprising:
feeding an aqueous solution of chlorous acid and/or an aqueous solution of alkali metal chlorite to a first face of a hydrophobic microporous membrane wherein the membrane comprises a catalyst suitable to catalyse the formation of chlorine dioxide from chlorous acid and/or a catalyst suitable to catalyse the formation of chlorine dioxide from the alkali metal chlorite;
wherein the chlorous acid and/or the alkali metal chlorite contact the catalyst and form chlorine dioxide;
providing a pressure differential between the first face of the hydrophobic microporous membrane and a second face of the hydrophobic microporous membrane, wherein the second face is in fluid communication with an aqueous recipient medium, the pressure differential aiding the transfer of gaseous chlorine dioxide through the membrane; wherein the gaseous chlorine dioxide passes through the hydrophobic microporous membrane.

According to a further aspect of the present invention there is provided a hydrophobic microporous membrane suitable for forming high purity chlorine dioxide comprising a first face, in use provided towards a feed of chlorous acid and/or alkali metal chlorite, a second face, in use provided towards an aqueous recipient medium; said membrane characterised in that the membrane comprises a catalyst suitable to catalyse the formation of chlorine dioxide from chlorous acid or alkali metal chlorite.

According to a further aspect of the present invention there is provided an apparatus for increasing the purity of an aqueous recipient medium comprising
the hydrophobic microporous membrane as described herein,
a first housing in fluid communication with the first face of the hydrophobic microporous membrane,
a second housing in fluid communication with the second face of the hydrophobic microporous membrane and in fluid communication with the aqueous recipient medium to be treated,
means to apply a pressure differential across the membrane.

Generally, high purity chlorine dioxide is produced according to the methods and apparatus disclosed herein. Said chlorine dioxide is generally added to the aqueous recipient medium for biocidal or oxidising purposes and to improve the purity of the aqueous recipient medium. Generally, the aqueous recipient medium is water and the addition of the chlorine dioxide produced according to the present teachings renders the water potable.

According to a further embodiment, there is provided a system for performing the methods disclosed herein. The system can include the apparatus as disclosed herein for generating chlorine dioxide, and generally analytical instrument(s) used to measure the level of impurities in the aqueous recipient medium. The flow rate of the aqueous recipient medium can also be measured. The system also can include a suitably programmed computer for carrying out one or more steps of the methods. For example, the suitably programmed computer can carry out or assist in one or more of measuring and adjusting the rate of production of chlorine dioxide; measuring and adjusting the pressure and rate of flow of the feed of chlorous acid, alkali metal chlorite and/or aqueous recipient medium; and displaying information related to the rate of addition of chlorine dioxide to the aqueous recipient medium flow, and equivalents thereof.

According to a further embodiment there is provided a kit of parts comprising the apparatus and/or the membrane as described herein and instructions for use.

Throughout the Application, where apparatus is described as having, including, or comprising specific components, or where processes are described as having, including, or comprising specific process steps, it is contemplated that apparatus of the present teachings also consist essentially of, or consist of, the recited components, and that the processes of the present teachings also consist essentially of, or consist of, the recited process steps.

In the Application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes", "including,", "comprise", "comprises" "comprising", "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. Moreover, two or more steps or actions may be conducted simultaneously.

Features, integers, characteristics, compounds, chemical moieties or groups described in conjunction with a particular aspect, embodiment or example of the invention are to be understood to be applicable to any other aspect, embodiment or example described herein unless incompatible therewith.

DETAILED DESCRIPTION

Definitions

Porosity or pore volume is defined as the fraction of the total volume of the material that is comprised of pores.

The bubble point method may be used for pore size determination. For a given fluid and pore size with a constant wetting, the pressure required to force an air bubble through the pore is in inverse proportion to the size of the pore. The procedure for bubble-point test may be that described in the American Society for Testing and Materials standard (ASMT) Method F316.

The purity of all solutions was calculated using the following equation:

$$\text{purity } \% = \frac{[ClO_2]}{[ClO_2] + [ClO_2^-] + [ClO_3^-] + [FAC]} * 100$$

(where $[ClO_2]$, $[ClO_2^-]$, $[ClO_3^-]$, $[FAC]$ are chlorine dioxide, chlorite, chlorate, and free available chlorine concentrations, respectively, in units of $mgL^{-1}$)

Method

According to a first aspect of the present invention, there is provided a method of forming chlorine dioxide comprising:

feeding a chlorous acid formulation and/or an alkali metal chlorite formulation to a first face of a hydrophobic microporous membrane wherein the membrane comprises a catalyst suitable to catalyse the formation of chlorine dioxide from chlorous acid and/or a catalyst suitable to catalyse the formation of chlorine dioxide from alkali metal chlorite;

wherein the chlorous acid and/or the alkali metal chlorite contacts the catalyst and oxidises to chlorine dioxide;

wherein gaseous chlorine dioxide passes through the hydrophobic microporous membrane to a second face thereof wherein the second face is in fluid communication with an outlet for providing the chlorine dioxide formed.

The hydrophobic microporous membrane comprises the catalyst(s) to produce chlorine dioxide. According to the methods of the present invention, chlorine dioxide is produced in situ, on, in or in close proximity to the hydrophobic microporous membrane. By locating the catalyst in the immediate vicinity of the hydrophobic microporous membrane, the risk of over-oxidation of $ClO_2$ to impurities such as chlorate and perchlorate is tninimised. This improves the purity of the resultant chlorine dioxide and improves the reaction yield from alkali metal chlorite Incorporation of a hydrophobic microporous membrane (in particular, expanded polytetrafluoroethylene (ePTFE), allows chlorine dioxide gas transfer by membrane permeation to the aqueous recipient medium to be treated. The use of such a membrane allows chlorine dioxide gas transfer while preventing reactant and by-product transfer over the membrane therefore treating the aqueous recipient medium (generally water) with ultra-pure chlorine dioxide.

The chlorine dioxide is generally predominantly produced at or towards the first face of the membrane. The chlorine dioxide is then generally drawn further into and through the membrane due to the pressure differential applied between the first and second faces of the membrane. The hydrophobic microporous membrane resists passage of liquid and ions through it, such as chlorite, chlorate, and chloride. Accordingly, chlorine dioxide is generated in situ, the risk of the formation of by-products such as chlorate and perchlorate is minimised, and the chlorine dioxide generated is separated from by-products as it is drawn through the membrane.

The hydrophobic microporous membrane is generally gas permeable and allows passage of gaseous chlorine dioxide and water vapour therethrough whilst resisting the passage of liquids.

The hydrophobic microporous membrane typically has an associated water contact angle of greater than 90°, generally 90 to 150°, suitably 90 to 120°.

Generally a pressure differential is applied between the first face and the second face of the membrane, and the pressure differential is less than the bubble point of the membrane.

The bubble point is dependent on the membrane (see definition above) but is generally in the range of 0.1 to 1 bar, typically 0.2 to 0.75 bar The chlorous acid formulation is typically in the form of an aqueous solution comprising chlorous acid.

The alkali metal chlorite formulation is typically in the form of an aqueous solution comprising alkali metal chlorite formulation.

Generally the chlorine dioxide formed has an associated chlorine dioxide purity of at least 95%, typically at least 98%, suitably at least 99%, more suitably at least 99.5%.

The chlorine dioxide formed is generally in aqueous solution. According to one embodiment, the aqueous solution has a concentration of 0.5 mg/L $ClO_2$ to 2000 mg/l.

The outlet is generally in fluid communication with a recipient medium to be disinfected, typically an aqueous recipient medium.

There is provided a method of forming chlorine dioxide comprising:
feeding an aqueous solution of chlorous acid and/or an aqueous solution of alkali metal chlorite to a first face of a hydrophobic microporous membrane wherein the membrane comprises a catalyst suitable to catalyse the formation of chlorine dioxide from chlorous acid and/or a catalyst suitable to catalyse the formation of chlorine dioxide from alkali metal chlorite;
wherein the chlorous acid and/or the alkali metal chlorite contact the catalyst and form chlorine dioxide;
providing a pressure differential between the first face of the hydrophobic microporous membrane and a second face of the hydrophobic microporous membrane, wherein the second face is in fluid communication with an aqueous recipient medium, the pressure differential aiding the transfer of gaseous chlorine dioxide through the membrane;
wherein the gaseous chlorine dioxide passes through the hydrophobic microporous membrane to form an aqueous solution of chlorine dioxide.

As noted above, the pressure differential applied between the first face and the second face of the membrane is generally less than the bubble point of the membrane.

For any of the methods disclosed herein, typically the chlorous acid formulation and/or the alkali metal chlorite formulation comprises less than 0.5 w/v. % chlorine dioxide, generally less than 0.2 w/v. %, suitably less than 0.1 w/v %.

According to one embodiment, the chlorous acid formulation and/or the alkali metal chlorite formulation comprises substantially no chlorine dioxide. The chlorous acid and/or alkali metal chlorite reacts with the catalyst to generate chlorine dioxide within the membrane, achieving around 200 to 750 mg/l, suitably around 500 mg/L (0.05 w/v %) solution of chlorine dioxide towards the first face of the membrane (relatively high concentration within the membrane). The chlorine dioxide gas will transfer through the membrane to the second face of the membrane to the recipient medium to form a dilute solution of around 0.2 to 0.75 mg/l, suitably around 0.5 mg/l (0.00005 w/v %) chlorine dioxide.

According to one embodiment, the membrane comprises polymeric material such as a polymerised high internal phase emulsion polymer (polyHIPE), ePTFE, PVDF, or ceramic, Typically the membrane comprises PTFE, PVDF or ceramic.

Generally, the membrane comprises or consists essentially of expanded PTFE or ceramic and the catalyst.

The use of such a membrane allows chlorine dioxide gas transfer and water vapour transfer while preventing transfer of other components from the first face of the membrane (for example reactant and by-product transfer). This selective transfer of chlorine dioxide through the membrane allows the generation of an extremely pure chlorine dioxide formulation, allowing the recipient medium (generally water) to be treated with ultra-pure chlorine dioxide.

The gas-permeable hydrophobic microporous membrane resists passage of liquid and ions, such as chlorite, chlorate and chloride therethrough. Accordingly, in the method of the present invention gaseous chlorine dioxide is generally allowed to pass through the membrane and liquids are substantially prevented from passing through the membrane.

The method of the present invention allow the production of a predetermined amount of exceptionally pure chlorine dioxide formulation, for instance 6 g/hr chlorine dioxide formulation having a purity of 98% or more. Previously, the design focus for chlorine dioxide generation equipment has been on the reactor, however the method and apparatus of the present invention focus on chlorine dioxide transfer through the membrane.

The dimensions of the membrane including length, width, membrane wall thickness, porosity are dependent on the rate of production of chlorine dioxide required and the flow rate of the recipient medium.

The thickness between the first face and the second face of the membrane is typically 5 to 15000 μm, typically, 100 to 10000 μm generally 10 to 1000 μm.

Where the membrane comprises ceramic, the thickness between the first face and the second face of the membrane is typically 1 to 10 mm.

According to one embodiment, the density of the membrane is 0.2 to 1.6 $g/cm^3$.

According to one embodiment, the method may include feeding a chlorous acid formulation and/or an alkali metal chlorite formulation to the first face of more than one hydrophobic microporous membranes.

The porosity of the membrane is suitably at least 40%, generally 50 to 80%, suitably 55 to 70%.

The filtration media generally comprises cavities and interconnects, said interconnects connecting the cavities to one another. Advantageously, the structure of the filtration media of the present invention is relatively uniform. Typically cavities and interconnects are interspersed through the filtration media at relatively uniform intervals The cavities include walls, and the maximum spacing between the walls of a cavity is generally 10 to 90 μm, typically 20 to 70 μm. Typically the mean maximum spacing between the walls of the cavities is 10 to 90 μm.

The interconnects include walls and the maximum spacing between the walls of an interconnect is generally 1 to 5 μm, typically 2 to 4 μm. Typically the mean maximum spacing between the walls of the interconnects is 1 to 5 μm.

Typically the first face of the filter element includes a cavity or interconnect at every 100 $μm^2$ or less; generally at every 50 $μm^2$ or less.

The membrane is suitably provided within a receptacle housing the recipient medium, typically a pipe or channel through which the recipient medium flows.

Where the membrane of the present invention may be provided in fluid communication with a motive recipient medium or a contained recipient medium. Where the membrane is provided in a motive recipient medium, the volumetric flow rate of the recipient medium is generally at least 1 m³/hour.

The membrane of the present invention is formed from material which is non-cytotoxic. The material is also generally non-biodegradable. The material is generally inert to the conditions commonly used in water purification. In particular the material is resistant to chlorine dioxide, chlorite, chlorate, chloride and acidic environments.

Preferably the material may be autoclaved and UV irradiated without degradation.

The method of the present invention may comprise generation of chlorine dioxide from chlorous acid as shown in the reaction mechanism below:

$$HClO_2 \rightarrow ClO_2 + H^+ + e^-$$

Alternatively, or additionally, the method comprises oxidation of sodium chlorite to form chlorine dioxide, and a general reaction mechanism is provided below:

$$NaClO_2 \rightarrow ClO_2 + Na^+ + e^-$$

Generally, the method involves feeding an aqueous solution of chlorous acid to the first face of the hydrophobic microporous. The chlorous acid may be formed from conversion of an alkali metal chlorite (such as sodium chlorite), for instance according to the following reaction:

$$NaClO_2 + H^+ \rightarrow HClO_2 + Na^+$$

The method of the present invention may comprise converting an alkali metal chlorite to chlorous acid prior to feeding the chlorous acid to the first face of the hydrophobic microporous membrane, suitably by passing the alkali metal chlorite through a cation exchange medium. The cation exchange medium is typically in the form of a cation exchange resin and is suitably provided within an ion exchange column.

Alternatively, alkali metal chlorite may be reacted with low concentrations of an acid in liquid form to produce chlorous acid.

The catalyst for the formation of chlorine dioxide from chlorous acid and/or alkali metal chlorite may be selected from the group consisting of a transition metal, or transition metal oxide, of Group 5B, 6B, 713 and 8 of the periodic table. Suitably the catalyst is based on platinum, palladium, manganese or molybdenum metal centres.

Where the method includes the formation of chlorine dioxide from chlorous acid, particular mention may be made of the catalysts platinum oxide, palladium oxide, manganese dioxide.

Where the method includes the oxidation of chlorite ions to form chlorine dioxide, particular mention may be made of the catalysts manganese porphyrins, manganese porphyrazines and molybdenum-based macrocycles.

Suitably the pressure differential between the first face and the second face of the hydrophobic microporous membrane is easily and precisely controllable. The rate of flow of the alkali metal chlorite/chlorous acid is thus easily and precisely controllable. By controlling the pressure differential, the risk of bubbles forming in the reactant liquor as it passes through the membrane is minimised. This minimises the consequent pass-through of impurities through the membrane.

The pressure differential is controlled (to be less than the bubble point of the membrane) to minimise the risk of bubble formation in the reactant formulation. This reduces the potential of wetting the membrane which may cause aqueous channelling through the membrane pores i.e. impurity/reactant/by-product passage through the membrane.

The catalyst may be embedded in the material used to form the membrane during or post-extrusion of the material to form the membrane. In such embodiments, the catalyst may be blown through the wall of the membrane, typically with application of heat and pressure to cause partial collapse of the pore structure to immobilise the catalyst. The catalyst may be encapsulated or unencapsulated.

Adding the catalyst into the mix prior to extrusion would give a more uniform mixture of catalyst throughout the membrane.

Suitably the catalyst is predominantly provided on and/or in close proximity to the first face. The membrane generally comprises a catalyst rich portion at or towards the first face. Typically, the catalyst is provided within the 50% of the wall thickness of the membrane at or towards the first face, generally within the 20% of the wall thickness of the membrane at or towards the first face, suitably within the 10% of the wall thickness of the membrane at or towards the first face, more suitably within the 5% of the wall thickness of the membrane at or towards the first face.

Typically portions of the membrane within the 10% of the wall thickness at or towards the second face comprise negligible amounts of catalyst or do not comprise any catalyst, suitably within the 20% of the wall thickness at or towards the second face, suitably within the 30% of the wall thickness at or towards the second face, more suitably within the 40% of the wall thickness at or towards the second face.

Alternatively, the catalyst may be distributed substantially evenly throughout the membrane. In this case, there would not be a concentration gradient of catalyst towards the first face of the membrane, and according to one embodiment, there would be a reliance on the countercurrent flow of water in order to remove $ClO_2$ from the outer face of the membrane The catalyst can be encapsulated in an inert material (such as within zeolite or ceramic) which is then embedded within the membrane. Alternatively, the catalyst can be incorporated directly into the membrane.

Typically, the catalyst will be immobilised in an inert material on or in the membrane. Suitable inert materials for such use will be known to the skilled man. Mention can be made of silicas, clays, ceramics, zeolites etc. The preferred method is encapsulation of the catalyst into the pores of a zeolite or ceramic.

The catalyst may be mixed with the material used to form the hydrophobic macroporous membrane during production thereof and prior to extrusion of the material.

The catalyst may be immobilised in the membrane by incorporating the catalyst in the material used to form the membrane prior to extrusion of the material during formation of the membrane. The catalyst may be encapsulated or unencapsulated prior to addition to the material used to form the membrane.

A suitable method of immobilising the catalyst in the membrane involves incorporating an inert material including the catalyst into the material used to form the membrane (typically PTFE) prior to extrusion of the material during formation of the membrane. This results in entrapped catalyst being immobilised within the membrane.

The catalyst may be immobilised in PTFE or PVDF resin prior to extrusion of the PTFE or PVDF to form the membrane. Preferably, zeolite or ceramic in which catalyst has been entrapped is immobilised in PTFE resin prior to extrusion of the PTFE to form the membrane.

According to one embodiment, the catalyst may be incorporated directly into porous ceramic.

The catalyst may be electrostatically bonded to the membrane, suitably to the first face of the membrane.

The method may include contacting any waste reactant liquor with UV light in the wavelength 350 to 365 nm to breakdown chlorine dioxide. The breakdown products of chlorine dioxide are aqueous ions which are relatively simple to control and are relatively safe to handle in the final waste line.

According to one embodiment, the method of the invention includes:
- converting an alkali metal chlorite (such as sodium chlorite) to chlorous acid, typically by passing the alkali metal chlorite through a cation exchange medium such as an ion exchange resin, or by reacting the alkali metal chlorite with liquid acid;
- feeding the resultant chlorous acid to a first face of a hydrophobic microporous membrane wherein the membrane comprises a catalyst suitable to catalyse the formation of chlorine dioxide from chlorous acid;
- wherein the chlorous acid contacts the catalyst and to oxidise to chlorine dioxide;
- wherein gaseous chlorine dioxide passes through the hydrophobic microporous membrane to a second face thereof wherein the second face is in fluid communication with an outlet for providing the chlorine dioxide formed;
- feeding the chlorine dioxide into the aqueous recipient medium to disinfect the aqueous recipient medium;
- optionally transporting any waste reactant liquor to a UV chamber for waste treatment, in particular exposing any waste reactant liquor to UV light in the wavelength 350 to 365 nm to breakdown chlorine dioxide.

According to a further embodiment, the method of the invention includes:
- feeding an alkali metal chlorite (such as sodium chlorite) to a first face of a hydrophobic microporous membrane wherein the membrane comprises a catalyst suitable to catalyse the oxidation of the alkali metal chlorite to chlorine dioxide;
- wherein the alkali metal chlorite contacts the catalyst and form chlorine dioxide;
- wherein gaseous chlorine dioxide passes through the hydrophobic microporous membrane to a second face thereof wherein the second face is in fluid communication with an outlet for providing the chlorine dioxide formed;
- feeding the chlorine dioxide into an aqueous recipient medium to purify the aqueous recipient medium;
- optionally transporting any waste reactant liquor to a UV chamber for waste treatment, in particular exposing any waste reactant liquor to UV light in the wavelength 350 to 365 nm to breakdown chlorine dioxide.

Generally a pressure differential is applied between the first face and the second face of the membrane, and the pressure differential is less than the bubble point of the membrane.

Generally, the chlorine dioxide produced according to the methods of the present invention has a purity of at least 95%, preferably 99.5 to 100%. In contrast, prior art methods are associated with the generation of chlorine dioxide having a purity level of around 50-90%.

According to a further aspect of the present invention, there is provided a hydrophobic microporous membrane suitable for forming chlorine dioxide comprising a first face, in use provided towards a feed of chlorous acid or alkali metal chlorite, a second face, in use provided towards an aqueous recipient medium characterised in that the membrane comprises a catalyst suitable to catalyse the formation of chlorine dioxide from chlorous acid and/or a catalyst suitable to catalyse the formation of chlorine dioxide from alkali metal chlorite.

The membrane is advantageously used in the methods described herein.

The membrane permits gas or vapour of chlorine dioxide to pass through but resists the passage of liquid and ions therethrough.

The dimensions of the membrane including length, width, pore size and thickness are dependent on the proposed use of the apparatus, including the volume of chlorine dioxide required and the flow rate of the aqueous recipient medium.

The thickness of the membrane is dependent on the material from which it is formed. Where the membrane is formed from PTFE or PVDF, the membrane may be 10 to 250 µm thick. Where the membrane is formed from ceramic, the membrane may be 5 to 10 mm thick.

Apparatus

There is provided an apparatus for increasing the purity of an aqueous recipient medium comprising
- the hydrophobic microporous membrane as described herein,
- a first housing in fluid communication with the first face of the hydrophobic microporous membrane,
- a second housing in fluid communication with the second face of the hydrophobic microporous membrane and in fluid communication with the aqueous recipient medium to be treated.

Suitably the apparatus includes means to apply a pressure differential across the membrane between the first face and the second face (generally pumping means, or pressure control means).

Suitably the apparatus is used to perform the method as described herein.

According to one embodiment, the apparatus includes a third housing comprising a cation exchange resin, said third housing in fluid communication with the first housing, wherein the cation exchange resin is suitable to convert alkali metal chlorite (in particular, sodium chlorite) to chlorous acid.

According to one embodiment, the apparatus includes means to control the pressure differential applied between the first face and the second face. The formation of bubbles in the reactant liquor is minimised through control of the pressure, reducing the risk of impurities passing through the membrane.

According to one embodiment, the first housing may include a mechanism to automatically block fluid communication between the first housing and the membrane once the first housing has emptied of the reactant liquor. Such a mechanism prevents air from being sucked from the first housing to the membrane by blocking fluid communication between the first housing and the membrane. The inclusion of such a mechanism reduces the risk of by-products passing through the membrane, and improves the purity of the chlorine dioxide formed, as reactants and/or by-products are not forced onto or through the membrane through the flow of air which is sucked through from the first housing.

The mechanism to automatically block fluid communication between the first housing and the membrane once the first housing has emptied of reactant liquor generally comprises a valve, typically a floating valve, for instance in the form of a body which floats in the reactant liquor and blocks the passage between the first housing and the membrane once the first housing has been emptied. According to one embodiment, the mechanism comprises a floating ball shut-off valve. When in the closed position, this mechanism may remove the pressure differential across the membrane, thus stopping flow through the membrane. The mechanism may block fluid communication between the first housing and the membrane once the first housing has emptied of reactant liquor, or while a proportion of the sample has not yet passed thorough the membrane.

When the mechanism is in the closed position, the pressure differential across the membrane is generally reduced by at least 90%, suitably the pressure differential is removed.

The apparatus generally includes control means to reduce or remove the pressure differential across the membrane. According to one embodiment, the apparatus includes control means which remove the pressure differential before all of the sample has passed through the membrane. The control means may comprise a valve (for instance a floating valve) which move to remove the pressure differential across the membrane before the sample has depleted. For instance, the control means may move to block access from the membrane to the vacuum, or pump which is establishing the pressure differential.

According to one embodiment, the apparatus includes a UV chamber in fluid communication with the first housing, wherein the UV chamber generates UV light having a wavelength of 350 to 365 nm.

Waste reactant liquor to be treated by ultraviolet light causes degradation of any remaining chlorine dioxide within the solution, allowing the waste to be disposed of easily. According to one embodiment, the second face of the membrane is supported with a membrane support. Generally, the first membrane support is in the form of a grid, or mesh and should include support for the membrane at least every 5 mm$^2$.

The apparatus of the present invention generally includes a detachable membrane. The membrane may be disposed, and the apparatus may be reassembled with a replacement membrane.

Kit

According to an aspect of the present invention, there is provided a kit of parts comprising the apparatus and/or the membrane as described herein and instructions for use.

The kit may include reagents and materials for measuring the levels of impurities in the chlorine dioxide produced, and/or for measuring the levels of impurities in the aqueous recipient medium before and/or after treatment. The kit may also include means to measure the flow rate of the aqueous recipient medium.

Kits can further include instructions for preforming the methods described herein and/or interpreting the results, in accordance with any regulatory requirements. In addition, software can be included in the kit for analysing the detected impurity levels. Preferably, the kits are packaged in a container suitable for commercial distribution, sale, and/or use, containing the appropriate labels, for example, labels including the identification of the chemical reactants included.

The present invention will now be described by way of example only with reference to the associated FIGURES in which.

Figure 1:
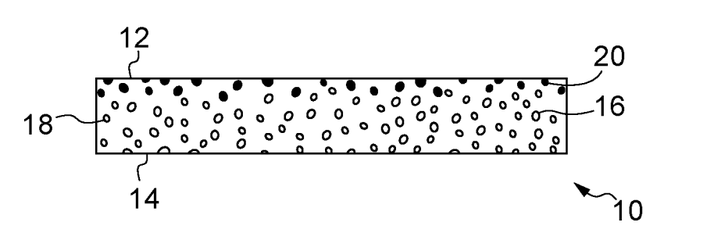
FIG. 1 shows a schematic representation of a cross-section through a membrane according to the present invention.

FIG. 1 shows a membrane 10, including a first face, 12 and a second face, 14. In use, the first face, 12, provided towards a feed of chlorous acid or alkali metal chlorite, and the second face, 14, is provided towards an aqueous recipient medium. The membrane includes pores, 16, 18. The membrane is formed from PTFE or ceramic. The membrane comprises a catalyst, 20, provided within the some of the pores 16, 18, towards the first face, 12. The catalyst is suitable to catalyse the formation of chlorine dioxide from chlorous acid or the catalyst is suitable to catalyse the formation of chlorine dioxide from alkali metal chlorite.

EXAMPLES

Decomposition of Chlorous Acid to Chlorine Dioxide

Initial testing was carried out to determine the decomposition rate of chlorous acid to chlorine dioxide without the addition of a catalyst.

The reactions are shown below for the full process:

$$NaClO_2 + H^+ \rightarrow HClO_2 + Na^+ \quad (1)$$

$$5HClO_2 \rightarrow ClO_2 + HCl + 2H_2O \quad (2)$$

Reaction (1) represents the exchange of sodium cation for a hydrogen ion when sodium chlorite is passed over the cation exchange resin.

Reaction (2) represents the breakdown of chlorous acid to chlorine dioxide.

Example 1A

Sodium chlorite precursor was diluted and passed over strong cation exchange resin to form chlorous acid. The chlorite concentration and pH of the diluted samples were tested before ion exchange. The pH was tested after ion exchange and any colour change (solution was initially clear) or other observations were noted.

| Sodium Chlorite precursor Dilution Factor | 1 | 10 | 100 |
|---|---|---|---|
| Chlorite Conc (mg/L) | 70167 | 7031 | 702.7 |
| pH (after dilution) | 9.2 | 8.9 | 8.7 |
| pH (after ion exchange) | 1.4 | 1.8 | 2.2 |
| Colour change/observations | Yellow/Green + gas evolution | Faint green + slight gas evolution | Clear |

Example 1B

A 703 mg/L chlorite solution was passed over strong cation exchange resin and the chlorine dioxide concentration was measured over time. Chlorine dioxide concentrations were measured every hour for 5 hours following ion exchange.

| Time (mins) | Chlorine dioxide conc. (mg/L) |
|---|---|
| 1 | 10 |
| 60 | 17 |
| 120 | 25 |
| 180 | 44 |
| 240 | 74 |
| 300 | 92 |

The results from examples 1A and 1b show that chlorous acid does breakdown over time to chlorine dioxide without the addition of a catalyst. This can be a very rapid or very slow reaction depending on the starting concentration of sodium chlorite.

A strong sodium chlorite solution will produce a strong chlorous acid solution after ion exchange, this solution will have a low pH (below 1.5 in our experimentation) and will rapidly form chlorine dioxide. This was seen in example 1A with the sample which was undiluted (dilution factor xi) by the yellow/green colour of solution and the gassing off of chlorine dioxide.

The opposite occurred when a weak. (dilution factor ×100) sodium chlorite solution was used to begin with. A sodium chlorite solution of approximately 700 mgL$^{-1}$ was passed over ion exchange and resulted in a clear solution of chlorous acid. This solution was higher in pH, 2.2, and did not form chlorine dioxide rapidly. There was no observed yellow colour in the solution indicating chlorine dioxide and there was no gas being evolved from the solution.

To track the breakdown with time of chlorous acid, a diluted sodium chlorite precursor was used in Example 1B. A solution of approximately 700 mgL$^{-1}$ sodium chlorite was passed over ion exchange to form a chlorous acid solution. Chlorine dioxide concentration in the chlorous acid solution was measured 1 minute after ion exchange, and then every hour for 5 hours.

The maximum concentration of chlorine dioxide expected is approximately 550 mgL$^{-1}$ from the sample used in example 1B. The maximum chlorine dioxide measured was 92 mgL$^{-1}$ after 5 hours, equivalent to approximately 17% yield.

Manganese Dioxide as Oxidation Catalyst
Static Testing without ePTFE Membrane

Static tests were carried out initially to determine an ideal quantity of manganese dioxide to use and an ideal chlorous acid precursor concentration needed.

Example 2A

Three 50 ml samples of 703.5 mgL$^{-1}$ chlorous acid solutions were transferred to flasks. 0.1 g, 0.5 g and 1 g of manganese dioxide, MnO$_2$, were added to one of the three samples. The flasks were stoppered and allowed to mix. The pH and chlorine dioxide concentrations were measured over 15 minutes.

| | Mass of MnO$_2$ added = 0.1 g | | |
|---|---|---|---|
| time (mins) | pH | ClO2 conc (mg/L) | Percentage Yield (%) |
| 0 | 2.1 | | 0.0 |
| 1 | 2.6 | 276 | 49.8 |
| 5 | 2.61 | 306 | 55.2 |
| 10 | 2.56 | 301 | 54.3 |
| 15 | | 290 | 52.3 |

| | Mass of MnO$_2$ added = 0.5 g | | |
|---|---|---|---|
| time (mins) | pH | ClO$_2$ conc (mg/L) | Percentage Yield (%) |
| 0 | 2.13 | | 0.0 |
| 1 | 2.6 | 347 | 62.6 |
| 5 | 2.55 | 352 | 63.5 |
| 10 | 2.5 | 354 | 63.8 |
| 15 | | 292 | 52.7 |

| | Mass of MnO$_2$ added = 1 g | | |
|---|---|---|---|
| time (mins) | pH | ClO$_2$ conc (mg/L) | Percentage Yield (%) |
| 0 | 2.11 | | 0.0 |
| 1 | 2.52 | 273 | 49.2 |
| 5 | 2.48 | 331 | 59.7 |
| 10 | 2.47 | 290 | 52.3 |
| 15 | | 313 | 56.4 |

Example 2B

Three 50 ml samples of chlorous acid were prepared at concentrations of approximately 700, 3500 and 7000 mgL$^{-1}$. 0.1 g of MnO$_2$ was added to each sample, the flasks stoppered, and each allow to mix. The pH and chlorine dioxide concentrations were measured over 15 minutes.

| | Chlorous Acid Concentration = 703.5 mg/L | | |
|---|---|---|---|
| time (mins) | pH | ClO$_2$ conc (mg/L) | Percentage Yield (%) |
| 0 | 2.25 | 9 | 1.6 |
| 1 | 2.66 | 284 | 51.2 |
| 5 | 2.77 | 316 | 57.0 |
| 10 | 2.7 | 275 | 49.6 |
| 15 | 2.61 | 340 | 61.3 |

| | Chlorous Acid Concentration = 3517.5 mg/L | | |
|---|---|---|---|
| time (mins) | pH | ClO$_2$ conc (rng/L) | Percentage Yield (%) |
| 0 | 1.75 | 99 | 3.6 |
| 1 | 2.01 | 1170 | 42.2 |
| 5 | 2.06 | 1350 | 48.7 |

-continued

Chlorous Acid Concentration = 3517.5 mg/L

| time (mins) | pH | $ClO_2$ conc (mg/L) | Percentage Yield (%) |
|---|---|---|---|
| 10 | 2.04 | 1270 | 45.8 |
| 15 | 2.08 | 1210 | 43.6 |

Chlorous Acid Concentration = 7035 mg/L

| time (mins) | pH | $ClO_2$ conc (mg/L) | Percentage Yield (%) |
|---|---|---|---|
| 0 | 1.56 | 147 | 2.7 |
| 1 | 1.8 | 1630 | 29.4 |
| 5 | 1.78 | 2192 | 39.5 |
| 10 | 1.8 | 2310 | 41.7 |
| 15 | 1.85 | 1890 | 34.1 |

0.1 g of catalyst produced similar quantities of chlorine dioxide as 1 g of catalyst. Chlorine dioxide yields were approximately 50-60% within the first minute of the reaction between chlorous acid and $MnO_2$, compared to chlorous acid decomposition without a catalyst which yielded approximately 2% $ClO_2$ in the same period of time.

0.1 g of $MnO_2$ produced the highest yields when reacting with weaker chlorous acid solutions. $ClO_2$ percentage yield of approximately 50% was achieved within one minute for a chlorous acid solution of approximately 700 $mgL^{-1}$. Lower percentage yields of approximately 40% and 30% were achieved in the same time period for stronger chlorous acid solutions of approximately 3500 and 7000 $mgL^{-1}$, respectively.

Recirculating Tests with ePTFE Membrane Treated to Incorporate a Catalyst

Example 2C $MnO_2$ catalyst has been immobilised in the ePTFE membrane for testing.

A 705 $mgL^{-1}$ chlorous acid solution was prepared by passing sodium chlorite solution over strong cation exchange resin. The chlorous acid solution was then pumped through a ePTFE membrane containing $MnO_2$, the chlorous acid was contained in a recirculating loop. Motive water was pumped counter-currently across the second face of the membranes.

Chlorine dioxide, chlorite ion and chlorate ion concentrations in the motive water toward the second face of the PTFE membrane were measured at defined time intervals after the beginning of the test. Purity of the solution was calculated.

| Time (mins) | $ClO_2$ conc (mg/L) | Chlorite (mg/L) | Chlorate (mg/L) | Solution Purity (%) |
|---|---|---|---|---|
| 0 | 0 | 0 | 0.110 | |
| 5 | 121 | 0.037 | 0.134 | 99.95 |
| 20 | 111 | 0.054 | 0.159 | 99.93 |
| 35 | 136 | 0.042 | 0.176 | 99.96 |
| 50 | 134 | 0.057 | 0.142 | 99.98 |
| 65 | 145 | 0.045 | 0.157 | 99.96 |

As can be seen from the results, chlorine dioxide solutions of greater than 99.93% purity were achieved throughout the test when recirculating a chlorous acid solution through an ePTFE membrane in which a suitable catalyst had been immobilised into the membrane.

Once-Through Tests with ePTFE Membrane Treated to Incorporate a Catalyst

Example 2D $MnO_2$ catalyst has been immobilised in the ePTFE membrane for testing.

A 693 $mgL^{-1}$ Chlorous acid solution was prepared by passing sodium chlorite solution over strong cation exchange resin. The chlorous acid solution was continuously pumped through a ePTFE membrane containing $MnO_2$. Motive water was pumped counter-currently across the second face of the membrane.

Chlorine dioxide, chlorite ion and chlorate ion concentrations in the motive water flowing across the second face of the PTFE membrane were measured at defined time intervals after the beginning of the test. Purity of the solution was calculated.

| Time (mins) | $ClO_2$ conc (mg/L) | Chlorite (mg/L) | Chlorate mg/L) | Solution Purity (%) |
|---|---|---|---|---|
| 0 | 0 | 0 | 0.134 | |
| 5 | 112 | 0.043 | 0.15 | 99.95 |
| 20 | 118 | 0.032 | 0.157 | 99.97 |
| 35 | 129 | 0.034 | 0.163 | 99.97 |
| 50 | 123 | 0.024 | 0.154 | 99.99 |
| 65 | 131 | 0.05 | 0.155 | 99.96 |

As can be seen from the results, chlorine dioxide solutions of greater than 99.95% purity were achieved throughout the test when pumping a chlorous acid solution through an ePTFE membrane in which a suitable catalyst had been immobilised into the membrane.

Platinum as Oxidation Catalyst

Recirculating Tests with ePTFE Membrane Treated to Incorporate a Catalyst

Example 3A

A platinum catalyst has been immobilised in the ePTFE membrane for testing.

A 705 $mgL^{-1}$ Chlorous acid solution was prepared by passing sodium chlorite solution over strong cation exchange resin. The chlorous acid solution was then pumped through the ePTEE membrane containing the catalyst, the chlorous acid was contained in a recirculating loop. Motive water was pumped counter-currently over the second face of the membrane.

Chlorine dioxide, chlorite ion and chlorate ion concentrations in the motive water moving across the second face of the PTFE membrane were measured at defined time intervals after the beginning of the test. Purity of the solution was calculated.

| Time (mins) | ClO$_2$ conc (mg/L) | Chlorite (mg/L) | Chlorate (mg/L) | Solution Purity (%) |
|---|---|---|---|---|
| 0 | 0 | 0 | 0.115 | |
| 5 | 90 | 0.041 | 0.156 | 99.91 |
| 20 | 96 | 0.062 | 0.172 | 99.92 |
| 35 | 104 | 0.047 | 0.165 | 99.96 |
| 50 | 99 | 0.032 | 0.166 | 99.97 |
| 65 | 86 | 0.039 | 0.172 | 99.95 |

As can be seen from the results, chlorine dioxide solutions of greater than 99.91% purity were achieved throughout the test when recirculating a chlorous acid solution through an ePTFE membrane in which a suitable catalyst had been immobilised into the membrane.

Once-Through Tests with ePTFE Membrane Treated to Incorporate a Catalyst

Example 3B

A platinum catalyst has been immobilised in the ePTFE membrane for testing.

A 700 mgL$^{-1}$ Chlorous acid solution was prepared by passing sodium chlorite solution over strong cation exchange resin. The chlorous acid solution was continuously pumped to the first face of the ePTFE membrane containing the catalyst. Motive water was pumped counter-currently over the second face of the membranes.

Chlorine dioxide, chlorite ion and chlorate ion concentrations in the motive water flowing across the second face of the PTFE membrane were measured at defined time intervals after the beginning of the test. Purity of the solution was calculated.

| Time (mins) | ClO$_2$ conc (mg/L) | Chlorite (mg/L) | Chlorate (mg/L) | Solution Purity (%) |
|---|---|---|---|---|
| 0 | 0 | 0 | 0.099 | |
| 5 | 97 | 0.032 | 0.129 | 99.94 |
| 20 | 94 | 0.051 | 0.136 | 99.94 |
| 35 | 90 | 0.053 | 0.139 | 99.94 |
| 50 | 87 | 0.06 | 0.125 | 99.95 |
| 65 | 89 | 0.046 | 0.138 | 99.93 |

As can be seen from the results, chlorine dioxide solutions of greater than 99.93% purity were achieved throughout the test when pumping a chlorous acid solution through an ePTFE membrane in which a suitable catalyst had been immobilised into the membrane.

Manganese Porphyrin as Oxidation Catalyst

Manganese porphyrins can be used as a catalyst for oxidising chlorite ion to chlorine dioxide. There is not requirement for ion exchange as catalysts in this group react directly with chlorite. The catalyst will also react with chlorine dioxide to further oxidise it to chlorate ion. The incorporation of manganese porphyrins into an ePTFE membrane reduces the potential for further oxidation of chlorine dioxide, as the ClO$_2$ should be formed by the reaction of catalyst and chlorite ion then be transferred through the membrane to the motive water line.

Any chlorine dioxide that is further oxidised to chlorate will remain in the impure chemical line.

Static Testing without ePTFE Membrane

Static tests were carried out initially to determine an ideal quantity of manganese porphyrin/manganese porphyrazine to use and an ideal chlorite precursor concentration needed.

Example 4H exemplifies static testing of the catalyst that was then incorporated into the ePTFE membrane.

Example 4A-I 2 litres of chlorite solution (concentration specified in each table) was prepared for each test by diluting commercially available sodium chlorite solution to the desired concentration. Either a manganese porphyrin or porphyrazine, was added to the diluted chlorite solution (mass added as specified in tables below) and allowed to react while stirring.

Example 4A

Manganese Porphyrin Used as Catalyst

| | |
|---|---|
| Vol dilution water (L) | 2 |
| Vol of Sodium Chlorite (ml/L) | 0.65 |
| Initial Chlorite Conc (mg/L) | 45.728 |
| Mass of Catalyst (g) | 0.012 |

| Time min | % conversion to ClO$_2$ | % conversion to FAC | % CHLORITE | % conversion to Chlorate |
|---|---|---|---|---|
| 0 | | | 90.23 | 0.19 |
| 5 | | 0.15 | 86.11 | 1.22 |
| 45 | | 0.26 | 86.24 | 1.28 |
| 85 | 0.04 | 0.59 | 88.95 | 1.44 |
| 115 | 0.09 | 0.68 | 88.17 | 1.52 |
| 155 | 0.11 | 0.66 | 86.91 | 2.00 |
| 185 | 0.17 | 0.70 | 86.91 | 1.87 |
| 270 | 0.44 | 1.18 | 76.96 | 2.80 |
| 1440 | 0.59 | 1.60 | 52.81 | 6.45 |

Example 4B

Manganese Porphyrin Used as Catalyst

| | |
|---|---|
| Vol dilution water (L) | 2 |
| Vol of Sodium Chlorite (ml/L) | 0.65 |
| Initial Chlorite Conc (mg/L) | 45.728 |
| Mass of Catalyst (g) | 0.025 |

| Time (min) | % conversion to ClO$_2$ | % conversion to FAC | % CHLORITE | % conversion to Chlorate |
|---|---|---|---|---|
| 0 | | | 88.67 | 0.78 |
| 25 | | 0.42 | 88.67 | 1.80 |
| 75 | | 0.44 | 90.56 | 1.63 |
| 110 | | 0.42 | 93.19 | 1.51 |
| 150 | 0.09 | 0.55 | 88.26 | 1.56 |
| 220 | 0.20 | 0.72 | 23.66 | 0.98 |
| 330 | 0.33 | 0.17 | 80.63 | 2.50 |
| 390 | 0.37 | 1.18 | 78.71 | 3.01 |
| 4320 | 0.57 | 2.60 | 50.57 | 9.61 |

Example 4C

Manganese Porphyrin Used as Catalyst

| | |
|---|---|
| Vol dilution water (L) | 2 |
| Vol of Sodium Chlorite (ml/L) | 0.65 |
| Initial Chlorite Conc (mg/L) | 45.728 |
| Mass of Catalyst (g) | 0.05 |

| Time (min) | % conversion to $ClO_2$ | % conversion to FAC | % CHLORITE | % conversion to Chlorate |
|---|---|---|---|---|
| 0 | | | 83.49 | 1.41 |
| 45 | 0.07 | 0.87 | 85.17 | 1.61 |
| 110 | 0.42 | 1.07 | 77.96 | 2.86 |
| 140 | 0.44 | 1.40 | 76.10 | 3.28 |
| 180 | 0.52 | 2.19 | 72.46 | 4.01 |
| 210 | 0.52 | 2.21 | 69.95 | 4.57 |
| 240 | 0.59 | 2.16 | 67.32 | 5.18 |
| 1440 | 0.66 | 3.00 | 39.55 | 11.75 |

Example 4D

Manganese Porphyrin Used as Catalyst

| | |
|---|---|
| Vol dilution water (L) | 2 |
| Vol of Sodium Chlorite (ml/L) | 0.65 |
| Initial Chlorite Conc (mg/L) | 45.728 |
| Mass of Catalyst (g) | 0.075 |

| Time (min) | % conversion to $ClO_2$ | % conversion to FAC | % CHLORITE | % conversion to Chlorate |
|---|---|---|---|---|
| 0 | | | 86.05 | 1.39 |
| 30 | 0.09 | 1.16 | 86.77 | 1.74 |
| 60 | 0.09 | 1.53 | 83.77 | 2.03 |
| 120 | 0.44 | 2.01 | 73.98 | 3.13 |
| 170 | 0.57 | 2.76 | 70.95 | 4.34 |
| 230 | 0.68 | 2.84 | 64.99 | 5.87 |
| 260 | 0.70 | 2.76 | 61.63 | 6.28 |
| 350 | 0.68 | 3.74 | 57.21 | 7.54 |
| 1440 | 0.72 | 4.11 | 14.04 | 17.48 |

Example 4E

Manganese Porphyrin Used as Catalyst

| | |
|---|---|
| Vol dilution water (L) | 2 |
| Vol of Sodium Chlorite (ml/L) | 0.65 |
| Initial Chlorite Conc (mg/L) | 45.728 |
| Mass of Catalyst (g) | 0.105 |

| Time (min) | % conversion to $ClO_2$ | % conversion to FAC | % CHLORITE | % conversion to Chlorate |
|---|---|---|---|---|
| 0 | | | 84.07 | 1.73 |
| 30 | | 0.48 | 84.87 | 1.51 |
| 60 | 0.07 | 1.09 | 79.90 | 1.78 |
| 135 | 0.42 | 2.03 | 70.14 | 3.19 |
| 230 | 0.55 | 2.43 | 65.32 | 4.61 |
| 280 | 0.68 | 2.93 | 67.46 | 6.02 |
| 320 | 0.68 | 3.00 | 52.33 | 6.86 |
| 1440 | 0.79 | 3.74 | 20.90 | 15.27 |

Example 4F

Manganese Porphyrin Used as Catalyst

| | |
|---|---|
| Vol dilution water (L) | 2 |
| Vol of Sodium Chlorite (ml/L) | 6.5 |
| Initial Chlorite Conc (mg/L) | 457.275 |
| Mass of Catalyst (g) | 0.05 |

| Time (min) | % conversion to $ClO_2$ | % conversion to FAC | % CHLORITE | % conversion to Chlorate |
|---|---|---|---|---|
| 0 | | | 86.86 | 8.75 |
| 30 | | | 87.74 | 9.39 |
| 60 | 0.11 | 0.70 | 126.07 | 10.47 |
| 120 | 0.20 | 1.29 | 126.07 | 10.47 |
| 280 | 0.24 | 1.29 | 86.21 | 4.55 |
| 360 | 0.26 | 1.20 | 85.77 | 3.51 |
| 4320 | 0.99 | 1.16 | 79.82 | 7.72 |

Example 4G

Manganese Porphyrin Used as Catalyst

| | |
|---|---|
| Vol dilution water (L) | 2 |
| Vol of Sodium Chlorite (ml/L) | 6.5 |
| Initial Chlorite Conc (mg/l) | 457.275 |
| Mass of Catalyst (g) | 0.05 |

| Time (min) | % conversion to $ClO_2$ | % conversion to FAC | % CHLORITE | % conversion to Chlorate |
|---|---|---|---|---|
| 0 | | | | |
| 15 | 0.38 | 0.31 | 56.38 | 1.64 |
| 30 | 0.30 | 0.31 | 53.18 | 3.37 |
| 60 | 0.23 | 0.30 | 53.78 | 4.33 |
| 90 | 0.23 | 0.21 | 54.32 | 4.22 |
| 120 | 0.29 | 0.18 | 50.80 | 4.85 |
| 240 | 0.23 | 0.12 | 50.89 | 6.06 |
| 360 | 0.23 | 0.10 | 49.58 | 7.09 |
| 1020 | 0.24 | 0.07 | 44.85 | 7.87 |

Example 4H

Manganese Porphyrazine Used as Catalyst

| | |
|---|---|
| Vol dilution water (L) | 2 |
| Vol of Sodium Chlorite (ml/L) | 6.5 |
| Initial Chlorite Conc (mg/L) | 457.275 |
| Mass of Catalyst (g) | 0.05 |

| Time (min) | % conversion to $ClO_2$ | % conversion to FAC | % CHLORITE | % conversion to Chlorate |
|---|---|---|---|---|
| 0 | | | | |
| 15 | 0.95 | 0.33 | 53.49 | 11.90 |
| 30 | 0.95 | 0.34 | 49.95 | 19.31 |
| 60 | 0.97 | 0.29 | 43.98 | 23.01 |
| 90 | 0.96 | 0.25 | 40.72 | 24.14 |
| 120 | 0.98 | 0.21 | 33.90 | 26.18 |
| 240 | 1.03 | 0.16 | 27.07 | 27.64 |
| 360 | 1.03 | 0.11 | 25.85 | 28.78 |
| 1020 | 1.03 | 0.08 | 22.57 | 30.77 |

The results from the above experiments show that suitable catalysts will produce chlorine dioxide directly from oxidation of chlorite ion. In all examples, there is further oxidation of chlorine dioxide to chlorate ion as the chlorine dioxide stays in contact with the catalyst.

Recirculating Tests with ePTFE Membrane Treated to Incorporate a Catalyst

Example 4I

A manganese porphyrazine catalyst has been immobilised in the ePTFE membrane for testing.

A 708 $mgL^{-1}$ sodium chlorite solution was prepared by diluting commercially available sodium chlorite solution with de-ionised water. The sodium chlorite solution was then pumped to the first face of the ePTFE membranes containing the catalyst, the sodium chlorite solution was contained in a recirculating loop. Motive water was pumped counter-currently over the second face of the membranes.

Chlorine dioxide, chlorite ion and chlorate ion concentrations in the motive water flowing across the second face of the PTFE membrane were measured at defined time intervals after the beginning of the test. Purity of the solution was calculated.

| Time (mins) | $ClO_2$ conc (mg/L) | Chlorite (mg/L) | Chlorate (mg/L) | Solution Purity (%) |
|---|---|---|---|---|
| 0 | 0 | 0 | 0.128 | |
| 5 | 110 | 0.045 | 0.154 | 99.94 |
| 20 | 119 | 0.029 | 0.162 | 99.97 |
| 35 | 104 | 0.036 | 0.167 | 99.96 |
| 50 | 112 | 0.039 | 0.152 | 99.98 |
| 65 | 118 | 0.048 | 0.158 | 99.95 |

As can be seen from the results, chlorine dioxide solutions of greater than 99.94% purity were achieved throughout the test when recirculating a sodium chlorite solution through an ePTFE membrane in which a suitable catalyst had been immobilised into the membrane.

Once-Through Tests with ePTFE Membrane Treated to Incorporate a Catalyst

Example 4J

A manganese porphyrazine has been immobilised in the ePTFE membrane for testing.

A 707 $mgL^{-1}$ sodium chlorite solution was by diluting commercially available sodium chlorite solution with de-ionised water. The sodium chlorite solution was continuously pumped to the first face of a ePTFE membrane containing the catalyst. Motive water was pumped counter-currently across the second face of the membranes.

Chlorine dioxide, chlorite ion and chlorate ion concentrations in the motive water flowing across the second face of the PTFE membrane were measured at defined time intervals after the beginning of the test. Purity of the solution was calculated.

| Time (mins) | $ClO_2$ conc (mg/L) | Chlorite (mg/L) | Chlorate (mg/L) | Solution Purity (%) |
|---|---|---|---|---|
| 0 | 0 | 0 | 0.128 | |
| 5 | 110 | 0.045 | 0.154 | 99.94 |
| 20 | 119 | 0.029 | 0.162 | 99.97 |
| 35 | 104 | 0.036 | 0.167 | 99.96 |
| 50 | 112 | 0.039 | 0.152 | 99.98 |
| 65 | 118 | 0.048 | 0.158 | 99.95 |

As can be seen from the results, chlorine dioxide solutions of greater than 99.94% purity were achieved throughout the test when pumping a sodium chlorite solution through an ePTFE membrane in which a suitable catalyst had been immobilised into the membrane.

Comparative Example 5

Comparative data was prepared using a process comprising the steps of:
a. Diluting a sodium chlorite solution,
b. Converting sodium chlorite to chlorous acids using an ion exchange column
c. Oxidising chlorous acid to chlorine dioxide by passing shlorous acid over a platinum based catalyst.

| Generation Equipment | Sample No | $ClO_2$ Conc (mg/L) | Free Chlorine Conc (mg/L) | Chlorite Conc (mg/L) | Chlorate Conc (mg/L) | Solution Purity (%) | Average Solution Purity (%) |
|---|---|---|---|---|---|---|---|
| 1 | 1 | 1.81 | 0.2 | 0.974 | 2.461 | 33.24 | 40.35 |
|   | 2 | 1.85 | 0.23 | 0.287 | 1.531 | 47.46 | |
| 2 | 1 | 146 | 2 | 4.2 | 73.2 | 64.77 | 66.78 |
|   | 2 | 220 | 5 | 72.9 | 62.3 | 61.08 | |
|   | 3 | 207 | 3 | 16.1 | 51.8 | 74.49 | |
| 3 | 1 | 718 | 6 | 7.7 | 251 | 73.06 | 61.03 |
|   | 2 | 655 | 90 | 16.5 | 575.6 | 48.99 | |
| 4 | 1 | 800 | 4 | 816.7 | 172.3 | 44.62 | 52.23 |
|   | 2 | 1290 | 4 | 678.7 | 183.1 | 59.84 | |
| 5 | 1 | 648 | 2 | 54.9 | 127.3 | 77.87 | 77.87 |
| 6 | 1 | 617 | 20 | 43.5 | 104 | 78.65 | 64.94 |
|   | 2 | 453 | 9 | 314.5 | 107.6 | 51.24 | |

-continued

| Generation Equipment | Sample No | ClO$_2$ Conc (mg/L) | Free Chlorine Conc (mg/L) | Chlorite Conc (mg/L) | Chlorate Conc (mg/L) | Solution Purity (%) | Average Solution Purity (%) |
|---|---|---|---|---|---|---|---|
| 7 | 1 | 507 | 3 | 512.9 | 99.5 | 45.17 | 37.58 |
|   | 2 | 190 | 21 | 517.8 | 80.9 | 23.47 |  |
|   | 3 | 491 | 0 | 524.1 | 98.1 | 44.11 |  |
| 8 | 1 | 294 | 0 | 295 | 200.1 | 37.26 | 36.51 |
|   | 2 | 282 | 0 | 320.7 | 185.8 | 35.76 |  |

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following Claims.

The invention claimed is:

1. A method of forming chlorine dioxide comprising:
providing a hydrophobic microporous membrane having a first face, a second face and a wall thickness extending between the first face and the second face, the membrane comprising a catalyst for catalysing the formation of chlorine dioxide from chlorous acid, wherein the catalyst is provided within the 50% of the wall thickness at or towards the first face, and wherein only a negligible amount of the catalyst is provided within the 30% of the wall thickness at or towards the second face;
feeding an aqueous solution of chlorous acid to the first face of the hydrophobic microporous membrane;
wherein the chlorous acid contacts the catalyst and oxidises to chlorine dioxide;
wherein chlorine dioxide in gaseous form passes through the hydrophobic microporous membrane to the second face thereof wherein the second face is in fluid communication with an outlet for providing the chlorine dioxide formed.

2. The method of claim 1, further comprising converting an alkali metal chlorite to chlorous acid prior to feeding the chlorous acid to the first face of the hydrophobic microporous membrane, by passing the alkali metal chlorite through a cation exchange resin.

3. The method of claim 1, further comprising the step of providing a pressure differential between the first face of the hydrophobic microporous membrane and the second face of the hydrophobic microporous membrane.

4. The method of claim 1, further comprising contacting a waste reactant liquor produced during the chlorine dioxide formation with UV light in the wavelength range 350 to 365 nm to breakdown chlorine dioxide.

5. The method of claim 1, wherein the hydrophobic microporous membrane comprises a material selected from the group consisting of polymerised high internal phase emulsion polymer (polyHIPE), ePTFE, PVDF, or ceramic.

6. The method of claim 5, wherein the hydrophobic microporous membrane is formed from ePTFE comprising the catalyst embedded therein.

7. The method of claim 1, wherein the hydrophobic microporous membrane comprises a catalyst rich portion at or towards the first face.

8. The method of claim 1, wherein the catalyst comprises a platinum, palladium, manganese or molybdenum metal center.

9. The method of claim 8, wherein the catalyst is selected from the group consisting of platinum oxide, palladium oxide, manganese dioxide, manganese porphyrins, manganese porphyrazines and molybdenum-based macrocycles.

10. The method of claim 5, wherein the catalyst is mixed with the material used to form the hydrophobic microporous membrane during production thereof and prior to extrusion of the material.

11. The method of claim 5, wherein the catalyst is mixed with the material used to form the hydrophobic microporous membrane during extrusion of the material to form the membrane.

12. The method of claim 1, wherein the catalyst is encapsulated, on zeolite or on ceramic.

* * * * *